(12) United States Patent
Merrick et al.

(10) Patent No.: US 6,631,926 B2
(45) Date of Patent: Oct. 14, 2003

(54) CLAMP FOR RETRACTOR BELT WITH ACTUATOR

(75) Inventors: David D. Merrick, Cicero, IN (US); Guy R. Dingman, Westfield, IN (US); Aaron Acton, Whitestown, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 109 days.

(21) Appl. No.: 09/935,441

(22) Filed: Aug. 22, 2001

(65) Prior Publication Data

US 2002/0003347 A1 Jan. 10, 2002

Related U.S. Application Data

(63) Continuation-in-part of application No. 09/483,121, filed on Jan. 14, 2000, which is a continuation-in-part of application No. 08/964,974, filed on Nov. 5, 1997, now Pat. No. 6,065,777.

(51) Int. Cl.[7] .............................................. B60R 22/06
(52) U.S. Cl. .................... 280/804; 280/801.1; 280/807; 280/808
(58) Field of Search .............................. 280/804, 801.1, 280/807, 808; 297/464, 468, 473, 474, 476, 479, 481, 483, 485, 486

(56) References Cited

U.S. PATENT DOCUMENTS

| | | | |
|---|---|---|---|
| 3,698,048 A | * 10/1972 | Weman | ...................... 297/485 |
| 4,726,625 A | 2/1988 | Bougher | |
| 4,832,410 A | 5/1989 | Bougher | |
| 4,919,484 A | 4/1990 | Bougher et al. | |
| 5,015,010 A | 5/1991 | Homeier et al. | |
| 5,054,815 A | 10/1991 | Gavagan | |
| 5,058,244 A | 10/1991 | Fernandez | |
| 5,125,686 A | 6/1992 | Yano et al. | |
| 5,138,749 A | 8/1992 | McCune et al. | |
| 5,149,136 A | 9/1992 | Maekawa et al. | |
| 5,154,446 A | 10/1992 | Blake | |
| 5,269,050 A | 12/1993 | Yewer, Jr. | |
| 5,286,057 A | 2/1994 | Forster | |
| 5,292,181 A | 3/1994 | Dybro | |
| 5,350,195 A | 9/1994 | Brown | |
| 5,350,196 A | 9/1994 | Atkins | |
| 5,443,302 A | 8/1995 | Dybro | |
| 5,495,646 A | 3/1996 | Scrutchfield et al. | |
| 5,609,367 A | 3/1997 | Eusebi et al. | |
| 5,653,003 A | 8/1997 | Freeman | |
| 5,661,877 A | 9/1997 | Bloomer | |
| 5,669,253 A | 9/1997 | Higgins | |
| 5,678,887 A | * 10/1997 | Sher | ............................ 297/483 |
| 6,065,777 A | * 5/2000 | Merrick | ....................... 280/804 |
| 6,312,015 B1 | * 11/2001 | Merrick et al. | ............. 280/804 |

* cited by examiner

*Primary Examiner*—Eric Culbreth
(74) *Attorney, Agent, or Firm*—Woodard, Emhardt, Moriarty, McNett & Henry LLP

(57) ABSTRACT

A clamp for relieving the tension in a seatbelt. An air operated actuator is activated by the passenger at a location remote from the clamp to lock the clamp to the seatbelt. The clamp is slidable on a track with a first endstop and an opposite second endstop. The clamp can be initially secured to the seatbelt at the first endstop. Subsequent movement by the passenger results in the clamp moving along the track. Upon reseating by the passenger, the clamp will be supported at a support position intermediate of the first and second endstops, resulting in increased slack in the shoulder portion of the seatbelt, reduced tension in the shoulder portion, and increased comfort for the passenger.

13 Claims, 17 Drawing Sheets

US 6,631,926 B2

CLAMP FOR RETRACTOR BELT WITH ACTUATOR

CROSS REFERENCE TO RELATED APPLICATION

This application is a continuation-in-part of U.S. patent application Ser. No. 09/483,121, filed Jan. 14, 2000 now U.S. Pat. No. 6,312,015 which is a continuation-in-part of U.S. patent application Ser. No. 08/964,974, filed Nov. 5, 1997 and now U.S. Pat. No. 6,065,777.

BACKGROUND OF THE INVENTION

The invention relates generally to passenger restraint systems which include seatbelts, and more particularly to a system which includes a seatbelt retractor.

Seatbelt systems, such as those typically employed in passenger vehicles, include a retractor for collecting excess belting and providing tensioning for the system. With certain types of retractors, a degree of tension in the belt is imposed by the retractor. This tension will provide a tugging against the shoulder of the passenger which can be uncomfortable. There are various designs which have been proposed to reduce this tugging and chafing of the shoulder belt against the shoulder of the passenger. Some of these designs permit the passenger to select the amount of excess slack in the seatbelt.

Nevertheless, there is always a need for an alternate passenger restraint system to overcome the situation in which tension from a retractor is felt against the shoulder of the passenger. The present invention provides a novel and unobvious way to reduce tension in the shoulder portions. The system disclosed herein is provided with an actuator located remotely from the retractor and belt allowing the user to conveniently activate and deactivate the system.

SUMMARY OF THE INVENTION

The present invention provides for improved apparatus and methods for a passenger restraint system for a vehicle. One aspect of the present invention includes a passenger restraint system with a passenger seat, a seatbelt for securing a passenger within the seat, and a retractor for retracting the seatbelt, the retractor being capable of holding the seatbelt during deceleration of the vehicle. The system further includes a track and a clamp moveable on the track. The clamp is capable of releasably clamping the seatbelt and includes an actuator located apart from the clamp to facilitate ease of use.

These and other objects and advantages of the present invention will be apparent from the drawings, description of the preferred embodiment, and the claims to follow.

DESCRIPTION OF THE PREFERRED EMBODIMENTS

Figure 1:
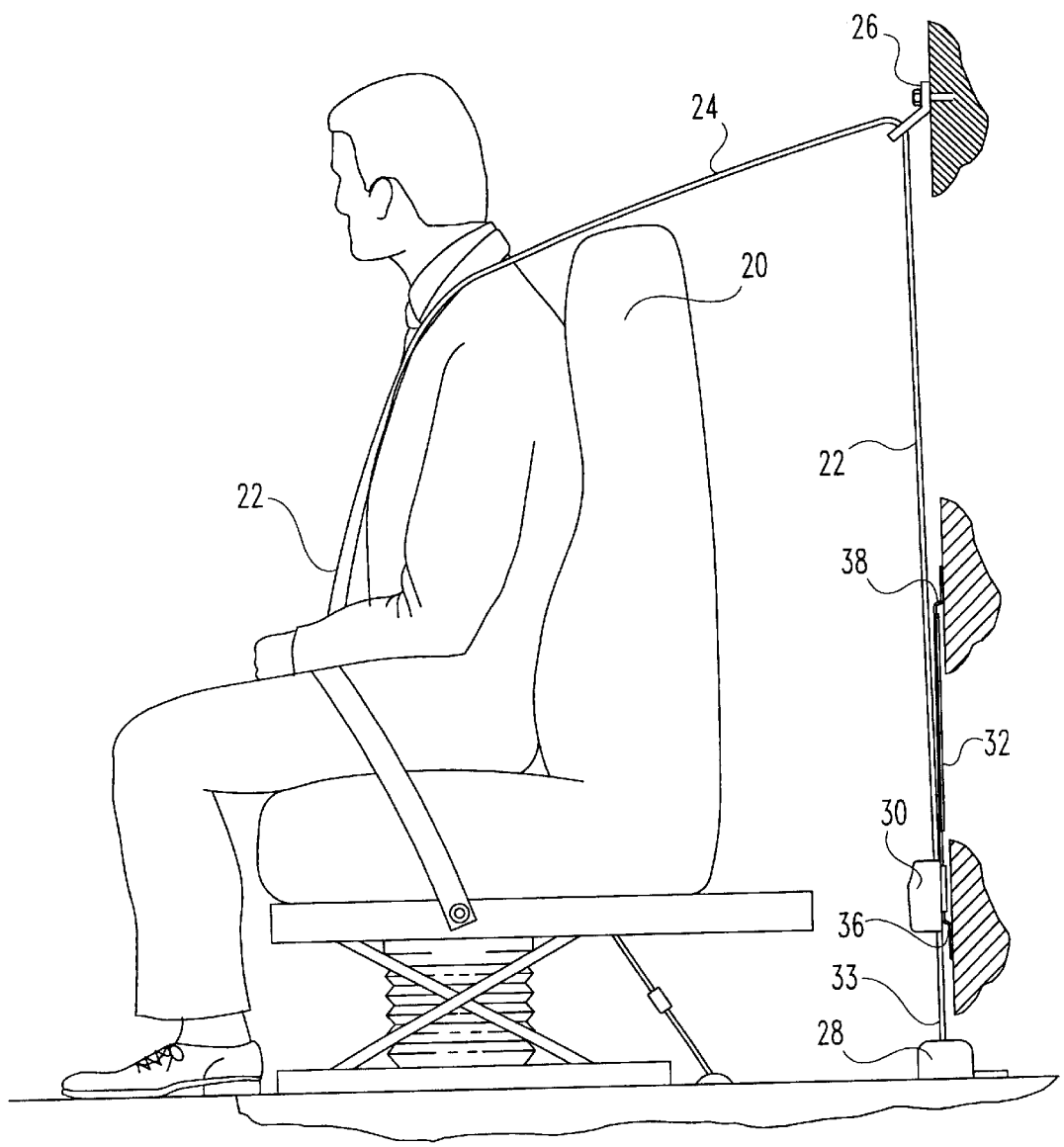
FIG. 1 shows a first alternate embodiment of the present invention as used within a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

FIG. 1 shows the first alternate embodiment of the present invention as used within a vehicle. A passenger is shown secured to a seat 20 by a three point seatbelt 22. Seatbelt 22 includes a shoulder portion 24 that rides over the shoulder of the passenger and passes through a support 26 which is anchored to the structure of the vehicle. Support 26 permits shoulder portion 24 to pass freely through. One example of support 26 is a D-loop, although there are other types of supports known to those of ordinary skill in the art.

Seatbelt 22 may be pulled from a retractor 28 which is anchored to the structure of the vehicle. One end of seatbelt 22 is attached to a spring-biased spool rotatably mounted within retractor 28 whereas the opposite end of seatbelt 22 is anchored to the frame of the seat. A conventional tongue is slidably mounted between the ends of the seatbelt and is releasably lockable, in the conventional manner, with a buckle also anchored to the seatbelt frame when shoulder portion 24 is pulled across the chest of the occupant.

Retractor 28 provides a length of belt to the passenger when seatbelt 22 is buckled, or after buckling when the passenger moves. During a rapid deceleration of the vehicle, retractor 28 locks seatbelt 22 from further extension such that the passenger is held securely in seat 20. Retractor 28 may be of the inertia reel type, an electronically controlled type, or other types known to those of ordinary skill in the art. During non-emergency operation, retractor 28 places tension in belt 22 in the direction of retracting seatbelt 22 to within retractor 28.

Located between retractor 28 and support 26 is clamp assembly 30 which is movable along track 32. Track 32 is secured to a portion of the vehicle. Although support 26, retractor 28, clamp 30, and track 32 are shown behind seat 20, and in front of the rear vehicle compartment wall, they also may be located to a side of seat 20, or along the B-pillar of the vehicle. Likewise, retractor 28 may be concealed or behind the rear compartment wall with seatbelt 22 extending through a slot in the compartment rear wall to the clamp assembly 30 mounted in front of the wall. Likewise, clamp 30 may be mounted adjacent support 26.

Figure 2:
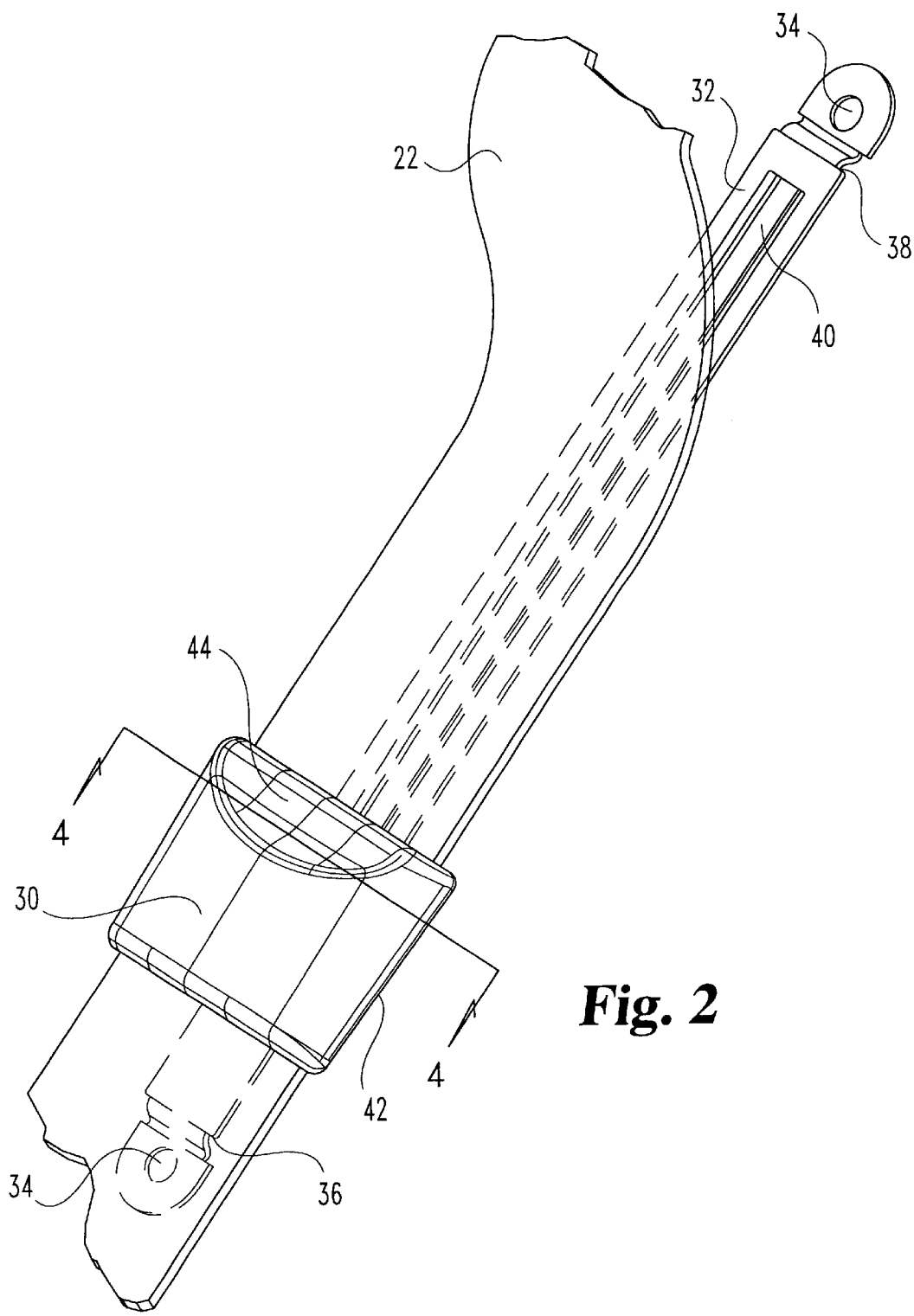
FIG. 2 is a perspective view of the clamp, track, and belt of FIG. 1.

FIG. 2 is a perspective view of the clamp, track, and belt of FIG. 1. Seatbelt 22 passes through clamp 30. Track 32 is retained to the vehicle by fasteners (not shown) that act through fastener holes 34. Clamp 30 is moveable along track 32 from a first endstop 36 to a second endstop 38. Endstops 36 and 38 are angled portions of track 32. Clamp 30 in FIG. 2 is shown placed at a support position 42.

Figure 3:
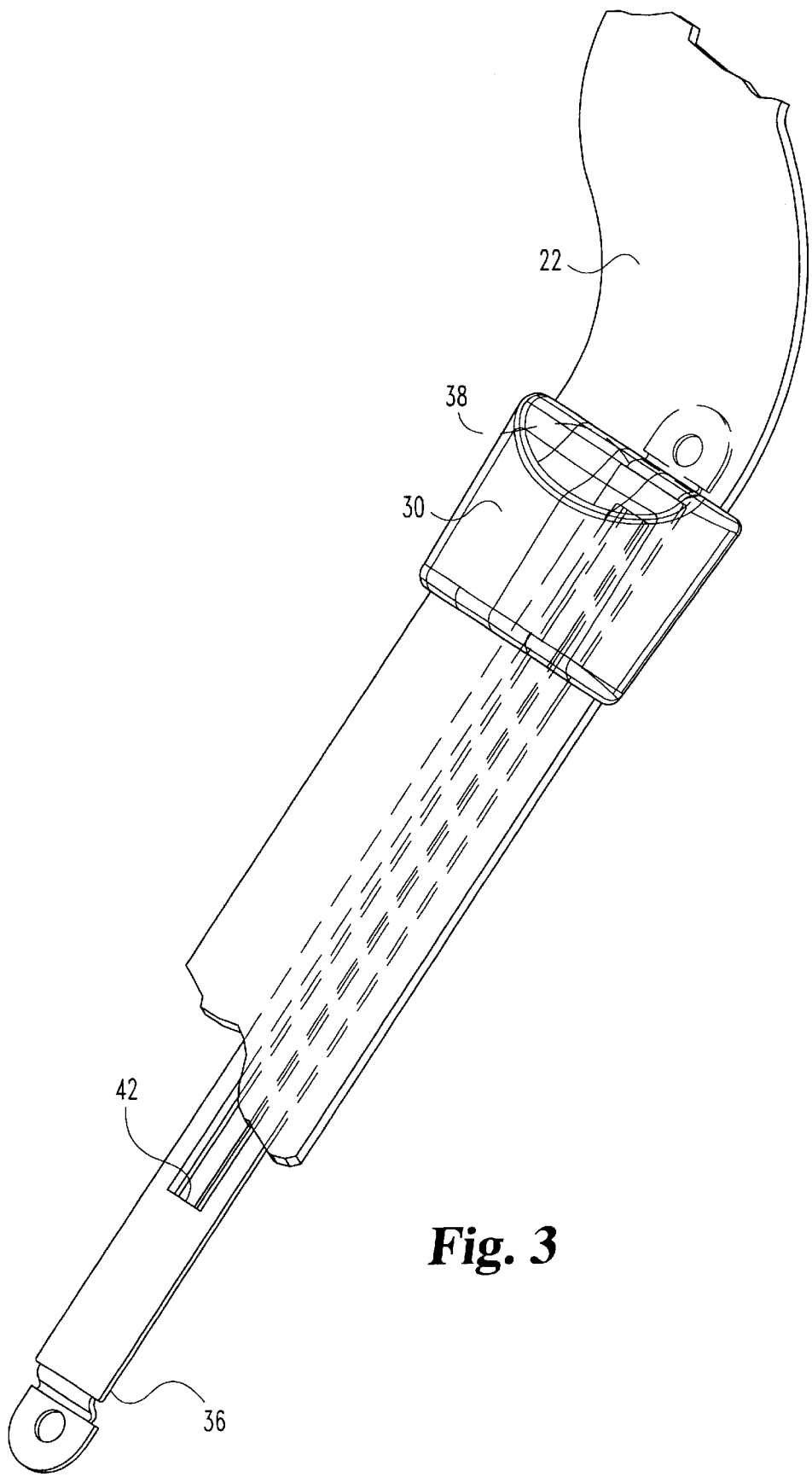
FIG. 3 is a perspective view of the clamp, track, and belt of FIG. 1 with the clamp moved to the second endstop.

FIG. 3 shows clamp 30 at second endstop 38. Track 32 includes a groove 40 (FIG. 2) that extends generally from second endstop 38 to a support position 42. Support position 42 is spaced apart from first endstop 36. Clamp 30 includes a rounded depression 44 to permit a person's hand to easily push clamp 30 toward first endstop 36.

Figure 4:
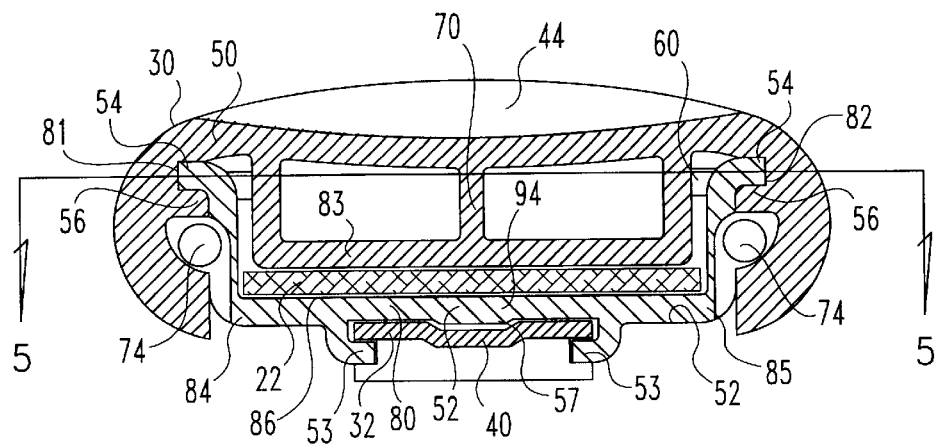
FIG. 4 is a view of the apparatus of FIG. 2 as taken along line 4—4 of FIG. 2.

FIG. 4 is a view of the apparatus of FIG. 2 as taken along line 4—4 of FIG. 2. Clamp 30 comprises a housing 50 and a slider 52. Slider 52 is slidably coupled to and moveable along track 32. Slider 52 includes two pairs of fingers 53 integrally attached to the main body 80 of the slider and having distal ends spaced apart from the main body forming a slot containing track 32. Fingers 53 wrap around the edges of track 32. Housing 50 is slidable relative to slider 52. A pair of lips 54 integrally attached to main body 80 of slider 52 extend outwardly in opposite directions into mutually facing recesses 81 and 82 formed in the opposite edges 56 of housing 50. Wall 83 of housing 50 is spaced apart from wall portions 84 and 85 of slider main body 80 forming a slot 86 through which seatbelt 22 is moveable.

Main body 80 of slider 52 also incorporates a center bump 57. Center bump 57 has a shape that fits with clearance within groove 40 of track 32. However, center bump 57 provides increased resistance to movement of slider 52 along track 32 between support position 42 and endstop 36. Bump 57 provides a slight interference fit between slider 52 and the grooveless portion of track 32. Although the embodiment includes a generally flat track 32 with a groove 40 therein, the present invention also contemplates other methods of guiding clamp 30 along a predetermined path such as, by way of example only, a groove within the structure of the vehicle or one or more rails mounted to the vehicle. In addition, such alternative tracks could incorporate alternative methods of providing increased resistance to movement of clamp 30 at a support position.

Figure 5:
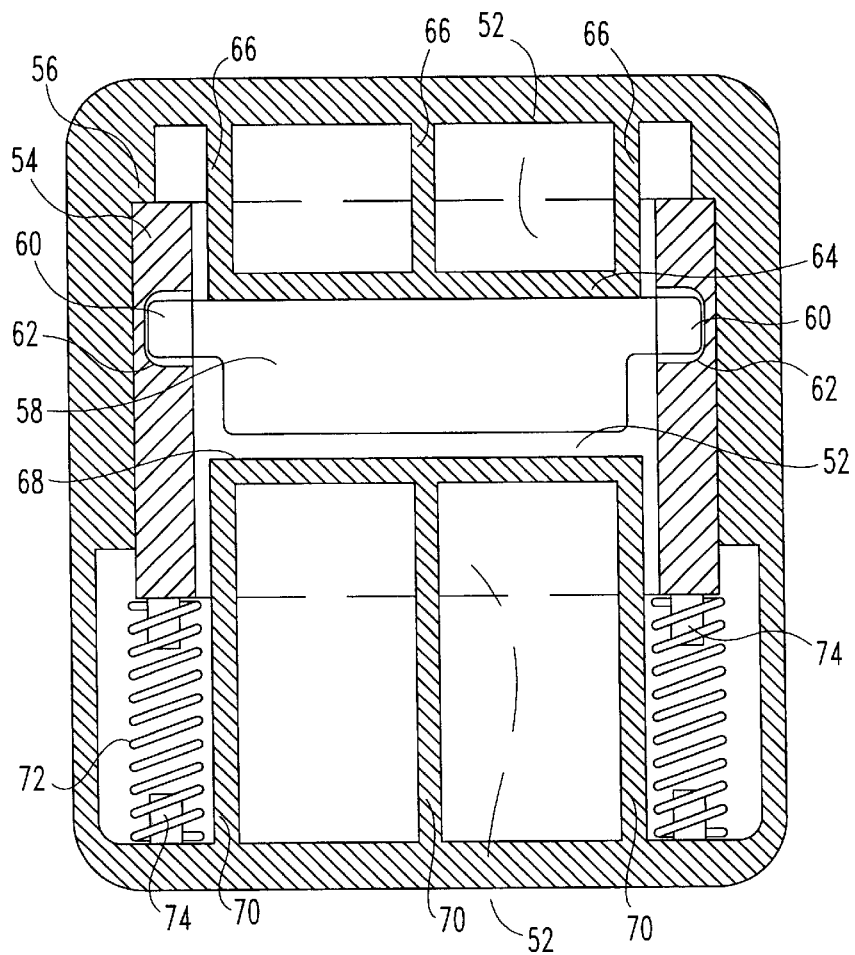
FIG. 5 is a view of the clamp of FIG. 2 as taken along line 5—5 of FIG. 4.

FIG. 5 is a view of the clamp of FIG. 2 as taken along line 5—5 of FIG. 4. Clamp 30 also includes within it a locking bar 58. Locking bar 58 includes a pair of cylindrical pivots 60 that are pivotally mounted within holes 62 within slider 52. Locking bar 58 is shown in FIG. 5 in contact with unlocking rest 64 of housing 50. Internal webs 66 support unlocking rest 64. Generally opposing unlocking rest 64 and located on the other side of locking bar 58 is locking rest 68. Locking rest 68 is supported in housing 50 by internal webs 70. A pair of springs 72 urge housing 50 relative to slider 52 so as to position locking bar 58 in contact with unlocking rest 64. A pair of pins 74 position each spring 72.

Figure 6:
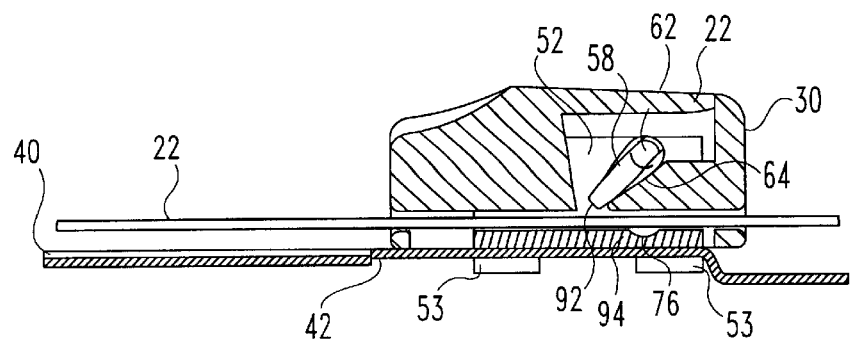
FIG. 6 shows a centered cross section of the clamp and track of FIG. 2 with the slider in contact with the first endstop.
Figure 7:
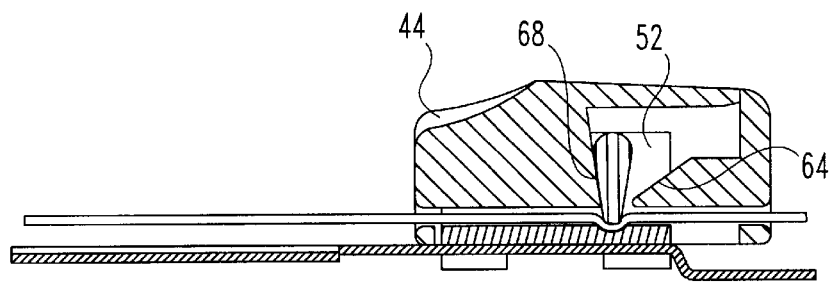
FIG. 7 shows the clamp and track of FIG. 6 with the clamp pushed against the first endstop.
Figure 8:
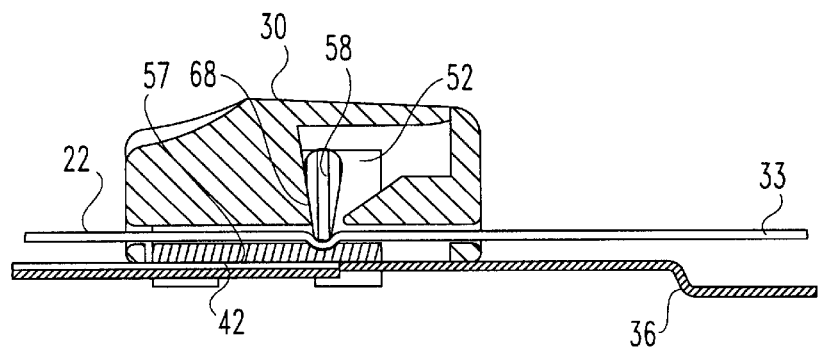
FIG. 8 shows the clamp and track of FIG. 6 with the clamp supported at a support position.

Operation of clamp 30 is shown in FIGS. 6, 7, and 8. The present invention provides an apparatus and methods for providing a predetermined amount of slack in the shoulder portion of a seatbelt securing a passenger to a seat in a vehicle. In order to provide the predetermined amount of slack, the present invention must be knowingly engaged by the passenger. After the passenger has fastened the tongue of seatbelt 22 into a buckle (not shown), the passenger pushes upon depression 44 of housing 50 and slides clamp 30 past support position 42 until slider 52 comes into contact with first endstop 36.

FIG. 6 shows the clamp and track of the present invention with the slider in contact with the first endstop. In FIG. 6, the passenger has moved clamp 30 past support position 42 and placed slider 52 in contact with first endstop 36 but has not fully pushed clamp 30 against first endstop 36. The bias of springs 72 has not been overcome by the passenger and slider 52 and housing 50 remain spaced apart such that locking bar 58 is in the unlocked position against unlocking rest 64. In FIG. 6, seatbelt 22 is free to slide within clamp 30.

FIG. 7 shows the clamp and track of the present invention with the clamp pushed to a locking position against the first endstop. In FIG. 7, the passenger has completed pushing clamp 30 against first endstop 36 with sufficient force to overcome the force of springs 72 and to slide housing 50 into the locked position relative to slider 52. As housing 50 is slid relative to slider 52 locking bar 58 moves out of contact with unlocking rest 64. Continued sliding of housing 50 relative to slider 52 results in locking rest 68 coming into contact with locking bar 58. Locking rest 68 has an angled face in contact with locking bar 58 that places locking bar 58 generally perpendicular to the portion of slider platform 94 opposite of holes 62. The slider platform 94 is integrally attached to and extends between portions 84 and 85 (FIG. 4)

of the main body 80 of the slider. In the embodiment there is a locking groove 76 in this portion of slider platform 94. As pressure is applied by the passenger on clamp 30, locking rest 68 places edge 92 of locking bar 58 into locking groove 76 such that belt 22 is clamped between edge 92 and locking groove 76. This action secures clamp 30 to seatbelt 22. Holes 62 for pivoting of locking bar 58 are generally opposite of locking groove 76 of slider platform 94.

As shown in FIG. 7, clamp 30 is secured to seatbelt 22, and as the passenger removes his hand from clamp 30, housing 50 will remain in the locked position relative to slider 52. If the passenger should move forward, for example in reaching something relatively close, the shoulder of the passenger will pull seatbelt 22 with clamp 30 secured to it along track 32 to a maximum location of second endstop 38. When the passenger returns to his normally seated position retractor 28 applies tension to portion 33 (FIG. 1) of belt 22 between retractor 28 and clamp 30. This tension is sufficient to move clamp 30 over that portion of track 32 that includes groove 40, clamp 30 moving freely over groove 40.

However, tension in portion 33 of seatbelt 22 is insufficient to pull clamp 30 past support position 42. As clamp 30 reaches support position 42, tension in portion 33 is insufficient to overcome the increased friction of bump 57 with support position 42. Therefore, clamp 30 remains at support position 42, as shown in FIG. 8, which is spaced apart a short, predetermined distance from first endstop 36. Thus, there is an increase in the length of seatbelt 22 around the passenger by the predetermined amount, and there is increased slack in the shoulder portion 24 of seatbelt 22 which results in shoulder portion 24 being more comfortable to the passenger. The predetermined increase in length of seatbelt 22 is equal to the distance from first endstop 36 to support position 42. Tension in belt portion 33 is reacted by the friction of bump 57 with support position 42. Thus, the present invention eliminates tension from the retractor into shoulder portion 24.

The present invention permits the passenger to freely move within the vehicle within the limit set by second endstop 38. After moving within this limit and then returning to a seated position, the passenger will not experience tension in shoulder portion 24 of seatbelt 22 because of the support of clamp 30 by support position 42. However, clamp 30 will release the securement of belt 22 between edge 92 and groove 76 if the passenger moves sufficiently far. For example, if the passenger reaches to the other side of the vehicle, then seatbelt 22 will pull clamp 30 against second endstop 38. As slider 52 of clamp 30 comes into contact with second endstop 38, the tension in belt 22 from the movement of the passenger will pull edge 92 out of locking groove 76. Springs 72 will urge housing 50 to become spaced apart to the unlocking position relative to slider 52. Locking bar 58 comes into contact with unlocking rest 64. For the vertical orientation of track 32 shown in FIG. 1, the unlocked clamp 30 slides freely over track 32 back to support position 42. Clamp 30 is no longer secured to seatbelt 22 and tension loads from retractor 28 are no longer reacted within track 32, but are instead felt against the shoulder of the passenger. The passenger may reset clamp 30 to the locked position by repeating the steps described above. During emergency operation the present invention does not interfere with the normal operation of seatbelt 22 or retractor 28.

FIGS. 9–19 depict the second alternate embodiment of the present invention. In this embodiment, a releasable clamp supports the tension provided by the retractor of this seatbelt and increases the length of seatbelt around the passenger by a predetermined amount. In this embodiment the invention includes a clamp capable of releasably clamping to the seatbelt, the clamp being slideably movable along a track between first and second endstops. The clamp includes a button which can be pushed to secure the clamp to the belt when the clamp is at the first endstop. If the passenger then pulls on the belt, as when reaching for a control switch of the vehicle, the clamp and seatbelt move along the track from the first endstop toward the second endstop. If the passenger moves sufficiently, the clamp will be pulled past a support position of the track that is intermediate of the first and second endstops. When the passenger returns to his regular seated position, tension from the retractor pulls the clamp seatbelt back towards the first endstop. However, pushing the button to secure the clamp to the belt also deflects a tab which limits the movement of the clamp and causes the clamp to stop at the support position. Since the support position is above the first endstop, a predetermined amount of slack is provided in the seatbelt. Seatbelt tension from the retractor which would otherwise be felt by the occupant is instead reacted or applied at the support position of the track, and little or no tension is felt by the passenger.

Figure 9:
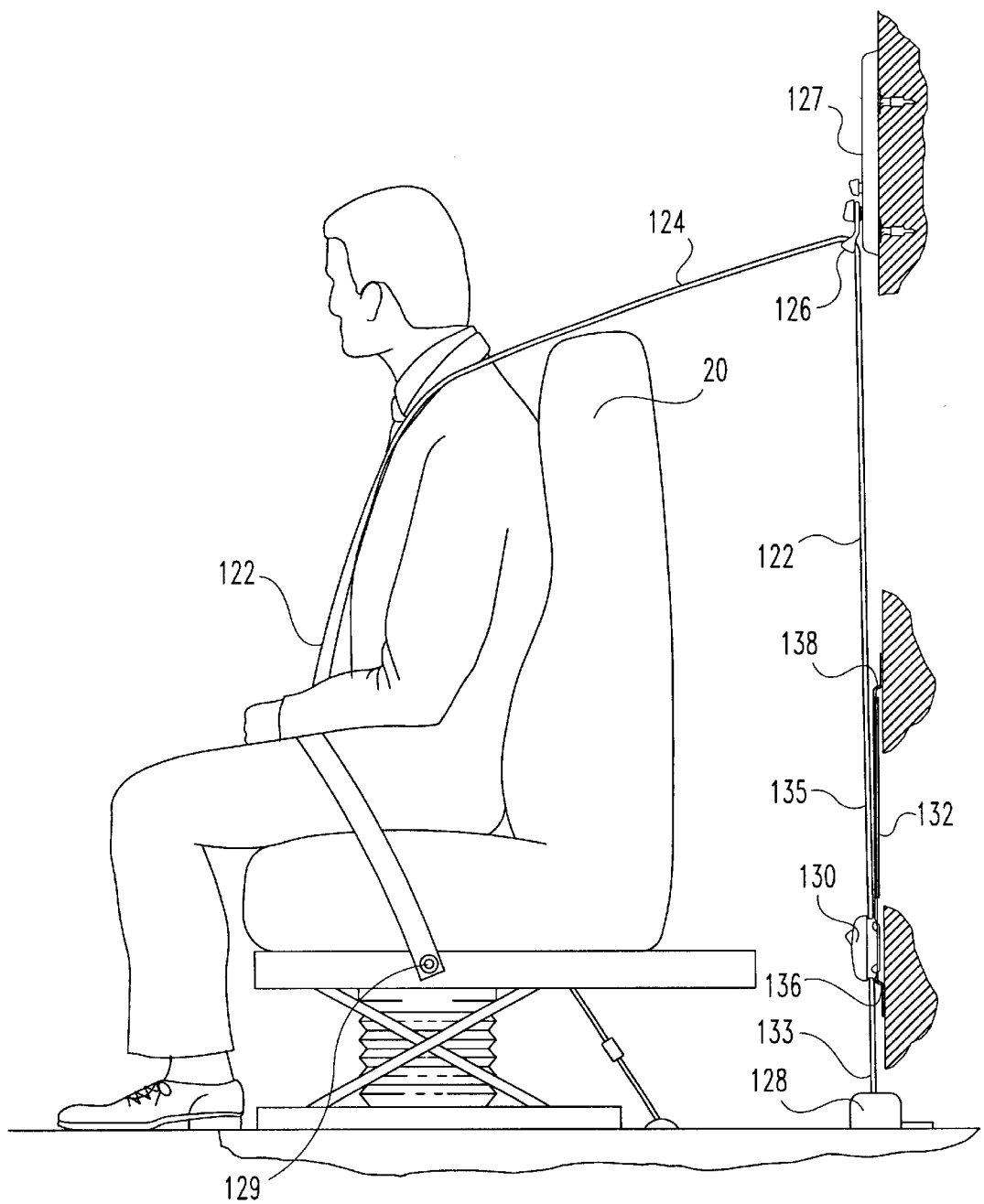
FIG. 9 shows a second alternate embodiment of the present invention as used within a vehicle.
Figure 10:
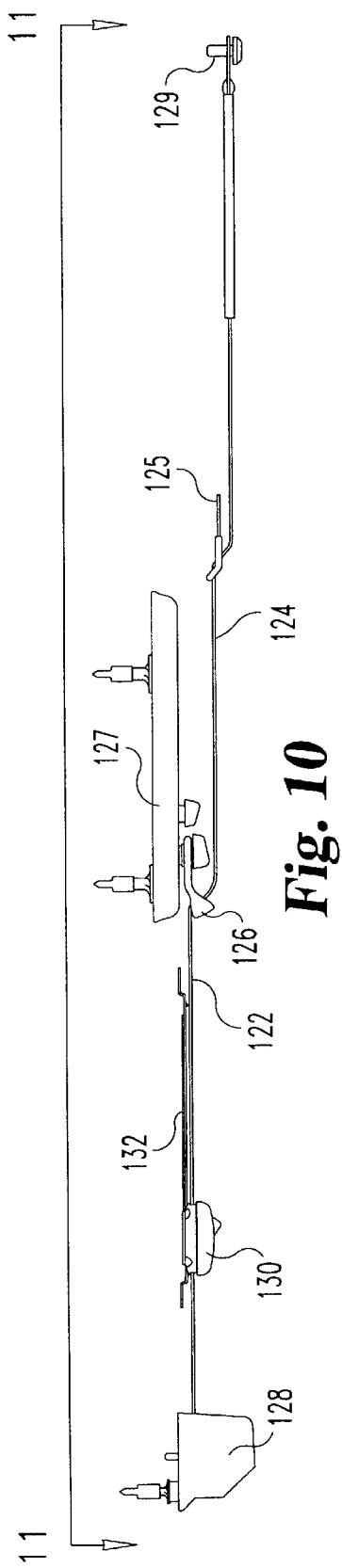
FIG. 10 is a side view of a portion of the apparatus shown in FIG. 9, as removed from the vehicle.
Figure 11:
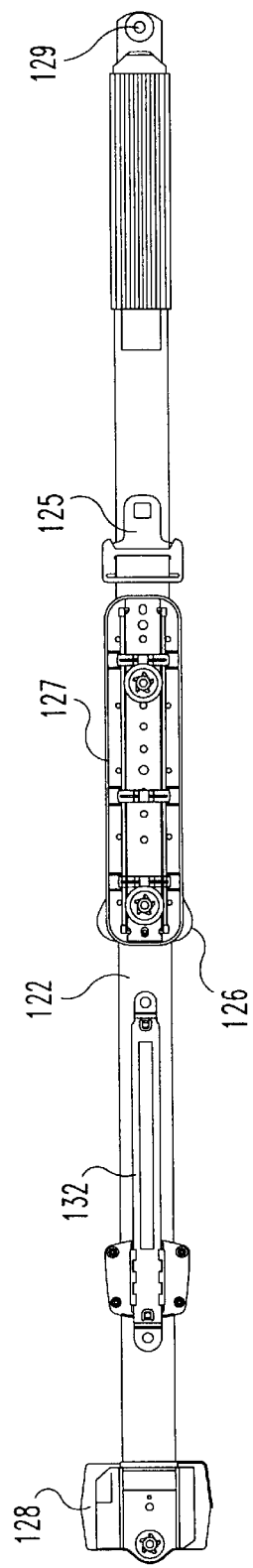
FIG. 11 is a view of the apparatus of FIG. 10 as taken along lines 11—11 of FIG. 10.

FIG. 9 shows the second alternate embodiment of the present invention as used within a vehicle. FIGS. 10 and 11 show the seatbelt apparatus of FIG. 9 as removed from the vehicle. A passenger is shown secured to a seat 20 by a three point seatbelt 122. Seatbelt 122 includes a shoulder portion 124 that rides over the shoulder of the passenger and passes through a support 126 which is anchored to the structure of the vehicle. Support 126 permits shoulder portion 124 to pass freely through. One example of support 126 is a D-loop. Some embodiments of the present invention include an adjustable support 127 attached to the vehicle which permits the passenger to slide D-loop 126 along a track. Although one example of support 126 is a D-loop, those of ordinary skill in the art will recognize other types of supports for the shoulder portion of the seatbelt.

Seatbelt 122 is pulled from a retractor 128 anchored to the structure of the vehicle. One end of seatbelt 122 is mounted to a spring-biased spool rotatably mounted within retractor 128, and an opposite end of seatbelt 122 is anchored to the frame of seat 20. A conventional tongue 125 is slideably mounted between the ends of seatbelt 122. Tongue 125 is releasably lockable in a conventional manner with a buckle (not shown) anchored to the vehicle frame.

When seatbelt 122 is buckled around the passenger, the belt webbing is pulled from retractor 128. Likewise, when the passenger moves from the seated position after buckling, belt webbing is pulled from retractor 128. During a rapid deceleration of the vehicle, retractor 128 locks seatbelt 122 from further webbing extension such that the passenger is held securely in seat 20. Retractor 128 may be of the inertia reel type, an electronically controlled type, or other types known to those skilled in the art. During non-emergency operation, retractor 128 places tension in belt 122 in the direction of retracting seatbelt 122 to within retractor 128.

Figure 12:
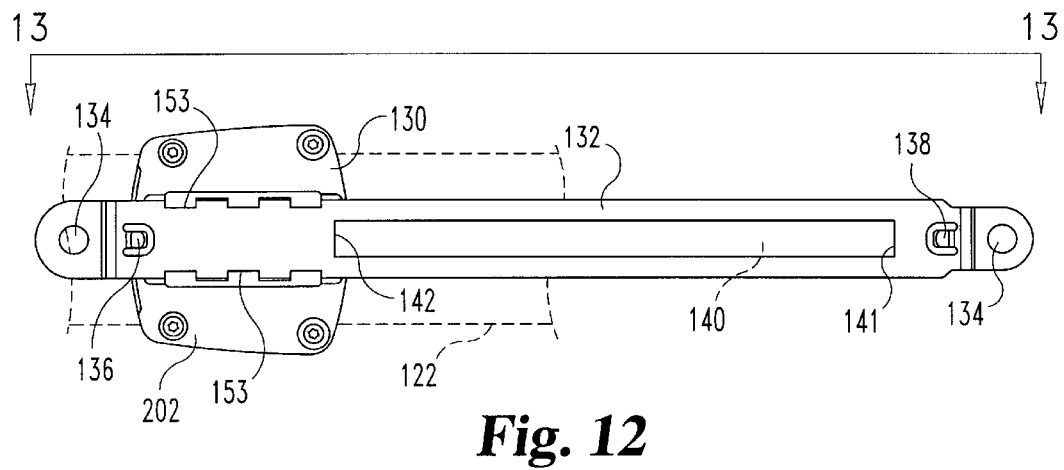
FIG. 12 is an enlarged view of the track, clamp, and seatbelt of FIG. 11.
Figure 13:
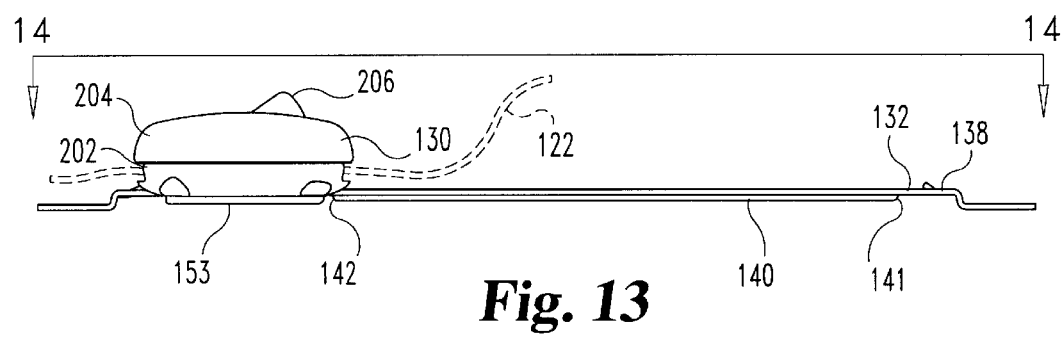
FIG. 13 is a view of the apparatus of FIG. 12 as viewed in the direction of arrows 13—13 of FIG. 12.
Figure 14:
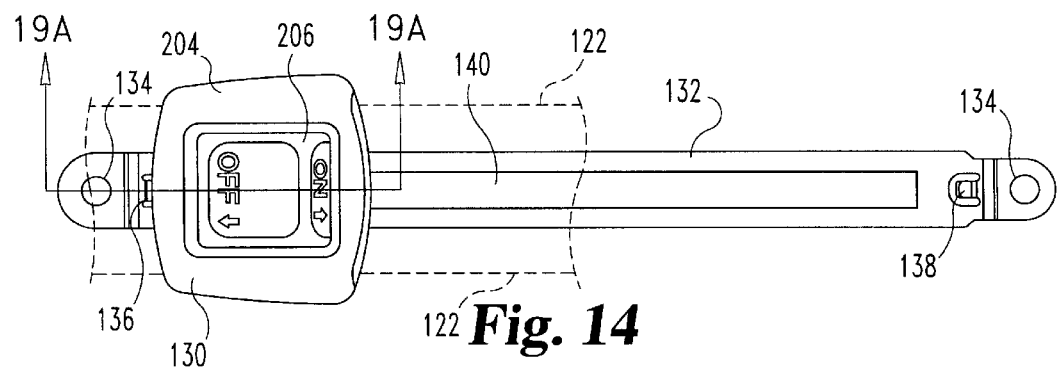
FIG. 14 is a view of the apparatus of FIG. 13 as viewed in the direction of arrows 14—14 of FIG. 13.

FIGS. 12, 13, and 14 show bottom, side, and top orthogonal views, respectively, of the track and clamp of FIGS. 9, 10, and 11. Seatbelt 122 is shown in dotted lines in FIGS. 12, 13, and 14. Located between retractor 128 and support 126 is clamp assembly 130 which is slideably movable along track 132. Clamp 130 includes a housing preferably comprised of a housing bottom half 202 fastened to a housing top half 204, the housing halves including between them a movable button 206. Housing halves 202 and 204 and button 206 are shown assembled in clamp 130 in FIGS. 12, 13, and 14. Clamp 130 is slideably coupled to track 132 by a plurality of fingers 153 which wrap around the edges of track 132, as best seen in FIG. 12. By the slidable coupling of fingers 153 to track 132, clamp 130 is moveable along track 132 between a first endstop 136 and a second endstop 138. Track 132 includes a recess or groove 140 placed lengthwise along a portion of the length of track 132. Groove 140 extends from a first edge or support position 142 to a second edge 141. Between support position 142 and second edge 141 track 132 has the general cross sectional shape of a flattened U, with groove 140 in the middle as the lower portion of the U-shape with the elevated, nonrecessed portions of track 132 on either side of the groove. Groove 140 projects away from button 206 of clamp 130, as can be seen in FIG. 19C.

Those of ordinary skill in the art will recognize the suitability of other configurations for track 132, including as one example, a cutout groove in place of the recessed groove that has been described. Track 132 is preferably fabricated as a stamped piece of steel, although those of ordinary skill in the art will recognize the suitability of other metals and plastic materials for the track. First and second endstops 136 and 138, respectively, are bent upwards, as best seen in FIG. 13, and limit the sliding movement of clamp 130. A pair of fastener holes 134 in the opposite offset ends of track 132 as best seen in FIGS. 12 and 14 are provided for attachment of track 132 to the vehicle.

Track 132 is secured to a portion of the vehicle in a generally vertical orientation, as best seen in FIG. 9. With this orientation, first endstop 136 is below second endstop 138. This vertical orientation permits clamp 130 to move under the influence of gravity to the first endstop when the clamp is not secured to seatbelt 122. Preferably track 132 is arranged vertically, although those of ordinary skill in the art will recognize that track 132 may be angled from a vertical orientation and still permit an unsecured clamp 130 to fall to the first endstop under the influence of gravity. Although support 126, retractor 128, clamp 130, and track 132 are shown in FIG. 9 behind seat 20 and in front of the rear vehicle compartment wall, they also may be located to a side of seat 20 or along the B-pillar of the vehicle. Also, retractor 128 may be concealed or behind the rear compartment wall with seatbelt 122 extending through a slot in the rear compartment wall to the clamp assembly 130 with track 132 mounted in front of the wall. Also, clamp 130 and track 132 may be mounted adjacent support 126.

Figure 15:
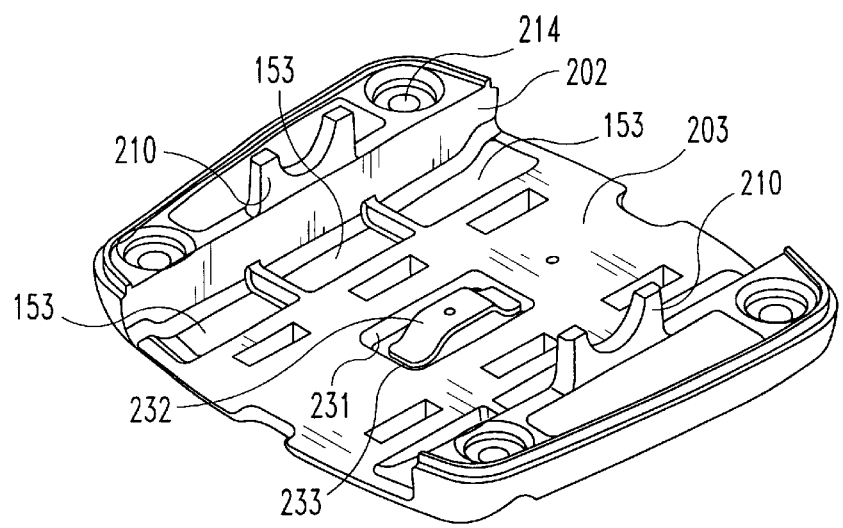
FIG. 15 is a top perspective view of the bottom portion of the clamp of FIG. 13.
Figure 16:
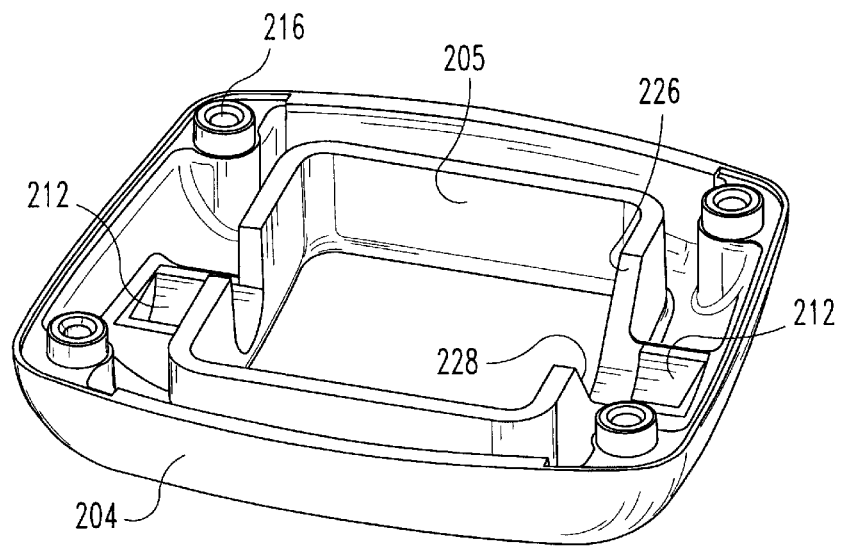
FIG. 16 is a bottom perspective view of the top portion of the clamp of FIG. 13.
Figure 17:
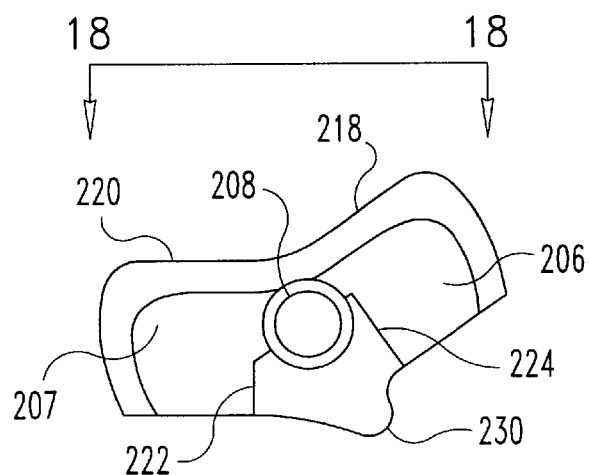
FIG. 17 is a side view of the button of FIG. 13.
Figure 18:
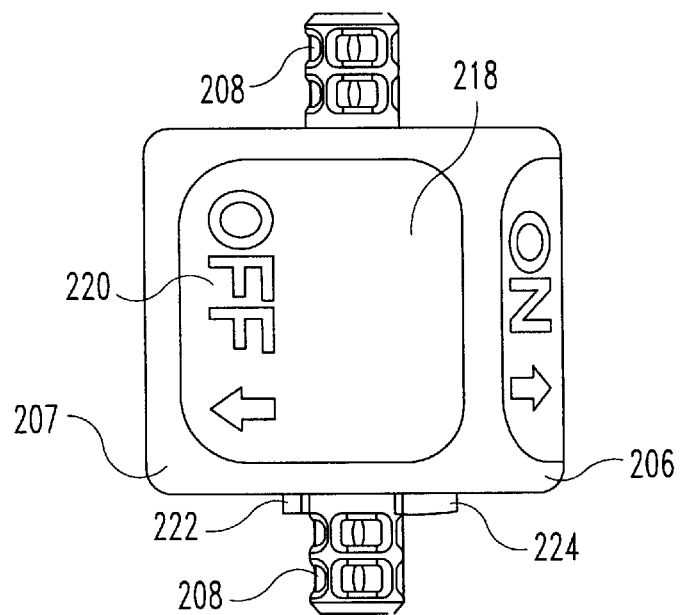
FIG. 18 is a view of the button of FIG. 17 as viewed in the direction of arrows 18—18 of FIG. 17.

FIGS. 15, 16, 17, and 18 depict the disassembled components which comprise clamp 130. FIG. 15 is a perspective view of the interior of housing bottom half 202, and FIG. 16 is a perspective view of the interior of housing top half 204, the housing halves being disassembled from one another so as to show interior details. FIG. 17 is a side view of movable button 206 in the same position as depicted for button 206 in FIG. 13, except removed from housing halves 202 and 204 of clamp 130. FIG. 18 is a top view of button 206.

Referring to FIG. 15, housing bottom half 202 includes a bottom wall 203. Located along the outer surface of bottom wall 203 are a plurality of fingers 153 which slideably couple housing half 202 to track 132, as best seen in FIG. 12. Bottom wall 203 also includes a relief opening 231. Placed within relief opening 231 and cantilevered from bottom wall 203 is a deflectable tab 232. Tab 232 is preferably fabricated from metal such as steel and attached within wall 203 during molding of housing half 202. Alternatively, tab 232 may also be formed from plastic during the molding of housing half 202. The free end of deflectable tab 232 includes an edge 233. By pressing on the middle of tab 232, edge 233 can be made to move toward the exterior of housing half 202. Tab 232 is a repeatedly deflectable portion of housing half 202, and can be pressed and deflected repeatedly to move edge 233 toward the exterior of the housing. Tab 232 returns to the undeflected position when the pressure is removed. Projecting upwardly from bottom wall 203 on either side of housing half 202 are a pair of support posts 210. Each support post 210 includes a cylindrically shaped groove. Housing half 202 also includes a plurality of through holes 214 for fasteners.

Referring to FIG. 16, top housing half 204 includes an interior wall surrounding a central aperture 205, aperture 205 providing clearance to receive the central portion of button 206. Housing half 204 also includes a pair of cylindrical cavities 212 placed on opposite sides of aperture 205. Located at the juncture of the wall-defining aperture 205 and one of the cylindrical cavities 212 are stop surfaces 226 and 228 for limiting the pivoting motion of button 206. Housing top half 204 also includes a plurality of portions 216 for threadably receiving the threaded portion of fasteners (not shown).

A pivotal button 206 is shown in FIGS. 17 and 18. Button 206 includes a rectangular central portion 207, and a pair of cylindrical axles 208 extending outwardly from opposing sides of central portion 207. Central portion 207 includes a first pressure surface 218 which is angled relative to a second pressure surface 220. Pressure surfaces 218 and 220 are arranged and constructed to receive pressure applied by the fingers or hand of the passenger. Referring to FIG. 17, application of pressure normal to first surface 218 results in clockwise pivoting of button 206 about axles 208. Application of pressure normal to second surface 220 results in counterclockwise pivoting of button 206 about axles 208. Button 206 also includes a projecting ridge or locking edge 230 which preferably spans the width of central portion 207. Button 206 also includes a pair of stops 222 and 224 to limit pivoting motion of button 206. Clamping stop 222 and unclamping stop 224 both extend from a side of central portion 207 adjacent an axle 208. Clamping stop 222 and unclamping stop 224 coact with stop surfaces 226 and 228, respectively, of housing top half 204.

Clamp 130 is assembled by placing a length of seatbelt 122 on the interior of bottom wall 203 of housing half 202. Button 206 is then placed on housing half 202 such that axles 208 are cradled within the cylindrical grooves of support posts 210, with projecting ridge 230 being adjacent seatbelt 122. Housing top half 204 is inverted from the position shown in FIG. 16, and placed on top of housing half 202 and button 206. Central portion 207 of button 206 protrudes through aperture 205 of housing half 204. The top half of axles 208 of button 206 are located within cylindrical cavities 212 of housing half 204. Clearance space is provided from support post 210 to axles 208, and from cylindrical cavities 212 to axles 208, so that button 206 is freely pivotal when assembled between housing halves 202 and 204. Housing half 202 may be secured to housing half 204 by the use of fasteners (not shown) extending through fastener holes 214 of bottom half 202 and into threaded portion 216 of housing half 204.

When button 206 is pivotally supported by housing halves 202 and 204, pivotal motion of button 206 is limited by the coaction of the button stops with the stop surfaces of housing half 204. For example, application of force to pressure surface 218 causes button 206 to move pivotally to a first position. The pivotal movement of button 206 toward the first position is stopped by the contact of clamping stop 222 of button 206 with stop surface 226 of housing half 204. Application of force to pressure surface 220 causes button 206 to pivot to a second position. Pivotal motion of button 206 toward the second position is stopped by contact of unclamping stop 224 of button 206 with stop surface 228 of housing top half 204. Thus, within limits set by the coaction of stops 222 and 224 with stop surfaces 226 and 228, respectively, button 206 of clamp 130 is pivotable between a first position and a second position.

Figure 19A:
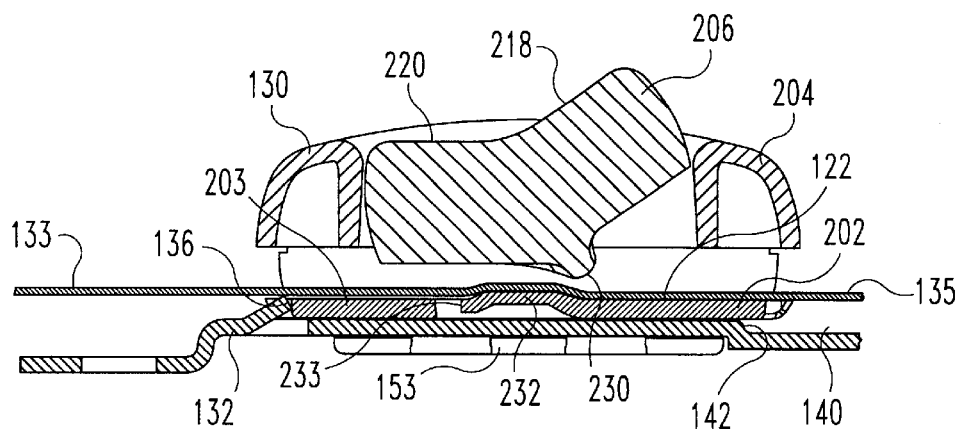
FIG. 19A is a cutaway view of the apparatus of FIG. 14 as taken along lines 19A—19A of FIG. 14.
Figure 19B:
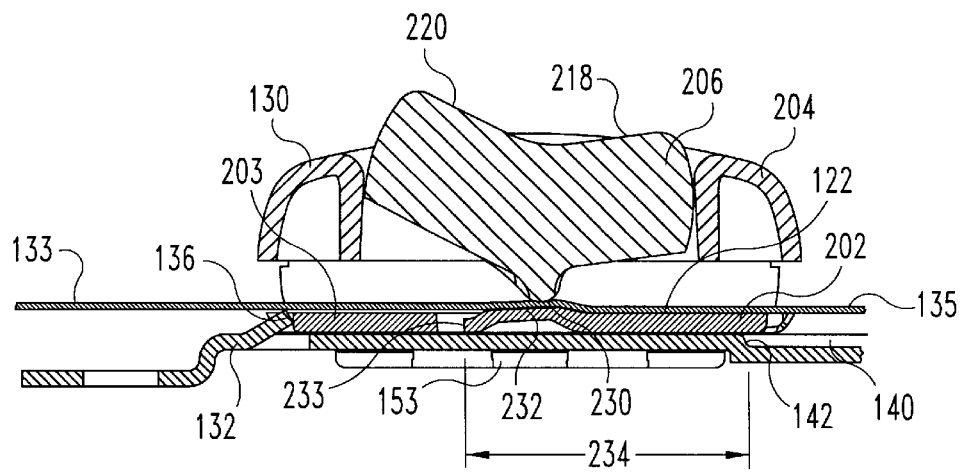
FIG. 19B is the same view of the apparatus of FIG. 19A only with the clamp secured to the seatbelt.
Figure 19C:
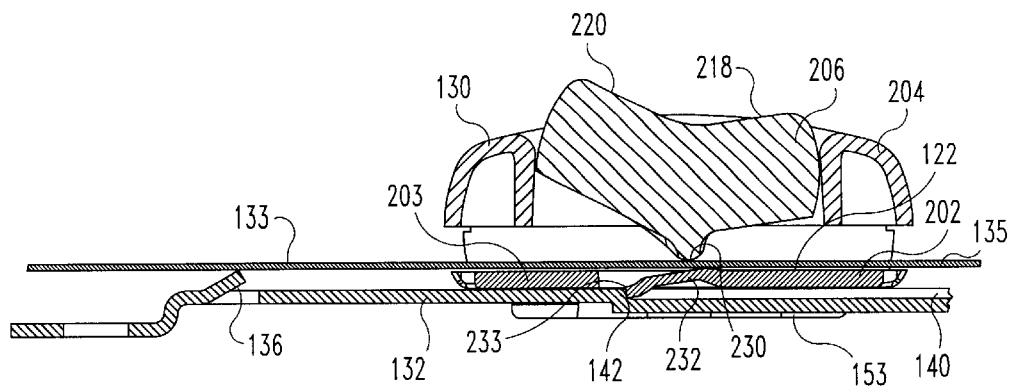
FIG. 19C is the same view of the apparatus of FIG. 19B only with the clamp moved to the support position.

FIGS. 19A, 19B, 19C, and 19D are cross sectional views of the clamp, tract, and belt during operation. FIG. 19A is a cross sectional view of the apparatus of FIG. 14 as taken along lines 19A–19A of FIG. 14. FIG. 19A depicts button 206 of clamp 130 in a second position in which clamp 130 is not secured to seatbelt 122. Because of clearance between button projection 230 and seatbelt 122, seatbelt 122 is free to slide within clamp 130 between button 206 and wall 203. Preferably, track 132 is arranged vertically as seen in FIG. 9. Because of this vertical orientation, clamp 130 slides along track 132 under the influence of gravity until it contacts first endstop 136. In the embodiment, retractor 128 continuously pulls on portion 133 of seatbelt 122 and, for the unclamped seatbelt 122 shown in FIG. 19A, thereby places belt portion 133, the portion between retractor 128 and deflectable tab 232, in tension. Since clamp 130 is not locked to seatbelt 122 in FIG. 19A, portion 135 of seatbelt 122, the portion between deflectable tab 232 and shoulder portion 124, is also in tension. Thus, retractor 128 is free to pull seatbelt 122 through clamp 130 except as limited by the passenger, and the passenger is free to move seatbelt 122 through clamp 130 except as limited by the retractor. After the passenger is secured to seat 20 by locking tongue 125 in the buckle, tension applied by the retractor in seatbelt portion 133 is felt on the shoulder of he passenger since that tension is communicated to seatbelt portions 135 and 124 (see FIG. 9).

Referring now to FIG. 19B, clamp 130 is releasably secured to seatbelt 122 when the passenger applies pressure to surface 218 of button 206 and pushes button 206 to the first position. As previously described, pivoting movement of clamp 206 is limited by contact of clamping stop 222 of button 206 with stop surface 226 of housing top half 204. Pivoting of button 206 to the first position places ridge 230 in contact with seatbelt 122, and subsequently pushes and deflects tab 232, including edge 233, into contact with track 132. Seatbelt 122 is secured to clamp 130 between wall 203 and ridge 230 when button 206 is placed in the second position. Tension force applied by the passenger through seatbelt portion 135 in excess of the tension force applied by retractor 128 pulls additional length of seatbelt 122 from the retractor and also pulls seatbelt 122 and clamp 130 upward along track 132. The tension force applied by the passenger must also exceed the friction force at the contact interface between edge 233 of deflected tab 232 and track 132.

As the passenger continues to apply sufficient tension to move clamp 130 along track 132, such as when the passenger moves forward to adjust a control of the vehicle, edge 233 of deflectable tab 232 moves axially past support position or edge 142 and into groove 140, as best seen in FIG. 19C. Once edge 233 of tab 232 has dropped into groove 140, clamp 130 is now more easily pulled along the grooved portion of track 132, there being little or no friction between the bottom of tab 232 and groove 140. When the passenger returns to the normal seated position, tension applied by retractor 128 within seatbelt portion 133 pulls clamp 130 and seatbelt 122 downwardly until edge 233 of tab 232 is in abutting relationship with edge 142 of groove 140. The abutting relationship of edge 142 and edge 233 limits the retraction of seatbelt 122 into retractor 128. Tension applied in portion 133 of seatbelt 122 is reacted against, or applied against, support position or edge 142 of track 132 by edge 233 of tab 232, this tension pulling clamp 130 toward support position 142. Portion 135 of seatbelt 122 on the passenger side of ridge 230 of button 206 is essentially free of tension from retractor 128. The travel of edge 233 from the position shown in FIG. 19B to the position shown in FIG. 19C increases the slack in shoulder portion 124 of seatbelt 122 by a predetermined amount, thus relieving some or all of the tugging pressure otherwise felt at the passenger's shoulder. FIG. 19B shows the increased slack as predetermined amount 234 of seatbelt 122.

Figure 19D:
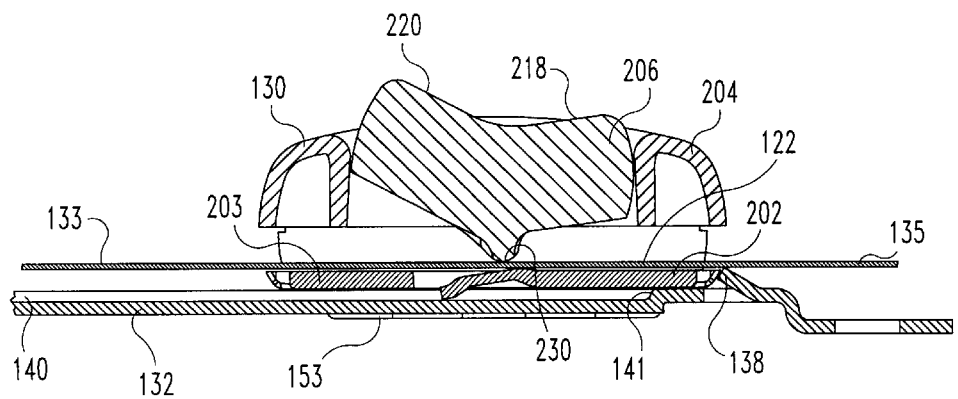
FIG. 19D is the same view of the apparatus of FIG. 19C only with the clamp moved to the second endstop of the track.

Referring to FIG. 19D, if the passenger moves a sufficiently large distance from the normal seated position, clamp 130, as secured to seatbelt 122, will move along track 132 as far as second endstop 138. The engagement of second endstop 138 with bottom housing half-202 limits upward sliding movement of clamp 130. Continued application of tension or pulling by the passenger upon portion 135 of seatbelt 122 releases seatbelt 122 from clamp 130. This release occurs because a portion of the tension force applied by the passenger becomes a sliding force acting on projecting ridge 230 of button 206. This sliding force acting on ridge 230 creates a counterclockwise moment on button 206. Further pulling on seatbelt 122 increases the moment on button 206 to where button 206 rotates in the counterclockwise direction to the second, or unclamped, position. Clamp 130 is then released from seatbelt 122, and falls under the influence of gravity to the position shown in FIG. 19A. Also, clamp 130 may be unlocked from seatbelt 122 by the application of pressure to surface 220 of button 206, thus pivoting button 206 in a counter clockwise direction and removing ridge 230 from contact with seatbelt 122. Pivoting movement of button 206 to the second position is limited by contact of clamping stop 224 of button 206 with stop surface 228 of housing top half 204. With button 206 pushed to the second position, there is sufficient clearance between ridge 230 and tab 232 for clamp 130 to move freely relative to seatbelt 122.

Figure 20:
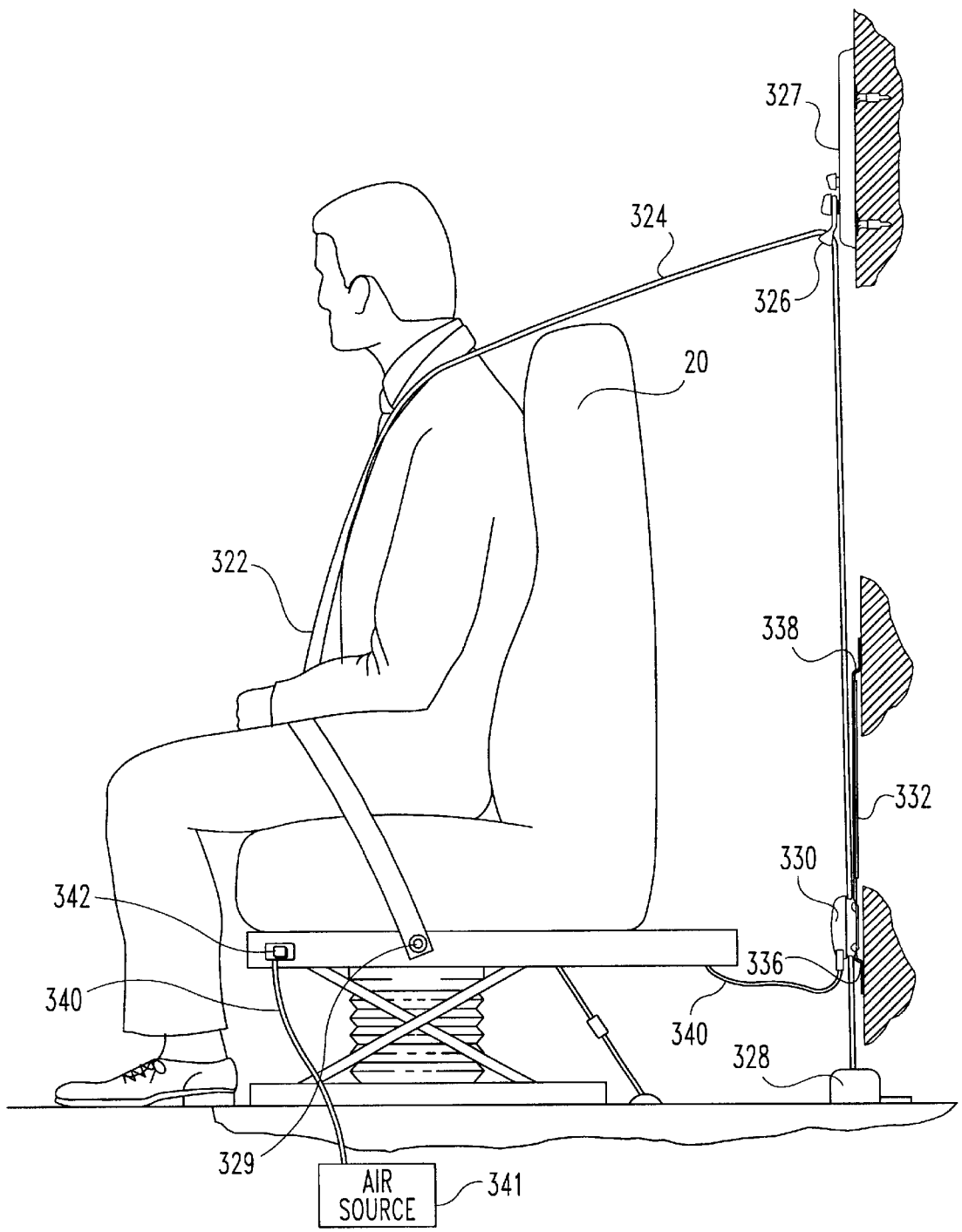
FIG. 20 shows the preferred embodiment of the restraint system as used within a vehicle.
Figure 21:
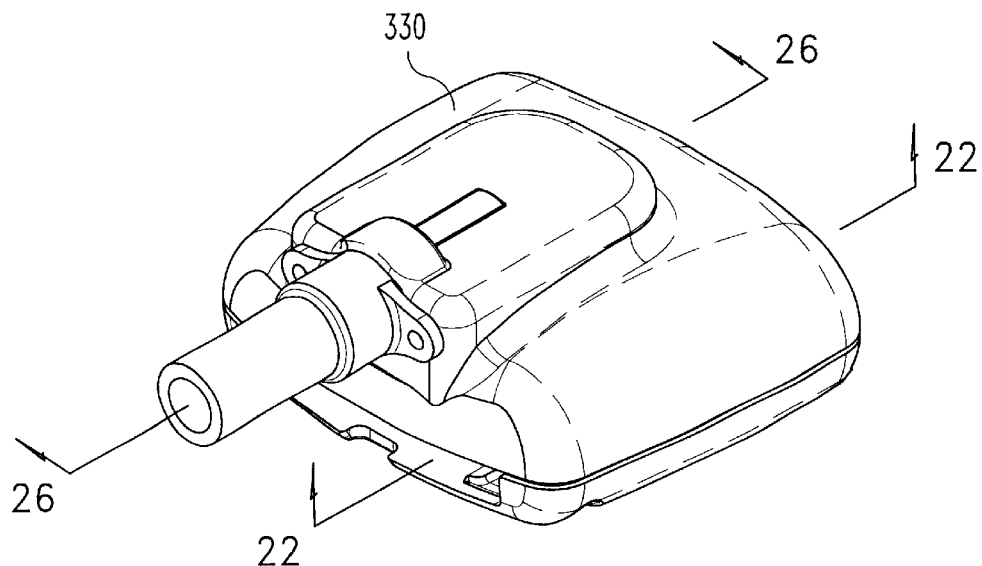
FIG. 21 is an enlarged perspective view of the clamp utilized in the system of FIG. 20.

The preferred and first embodiment of the present invention is disclosed in FIGS. 20–26. The preferred embodiment is identical to the second alternate embodiment shown in FIGS. 9–19 with the exception that an air operated actuator is utilized for control of the clamp as compared to the push button depicted in FIGS. 17 and 18. Thus, a passenger is shown in FIG. 20 as secured to seat 20 by a 3 point seatbelt 322 having a shoulder portion 324 extending through a D-loop 326 mounted to a portion 327 of the vehicle. One end of the seatbelt is secured by fastener 329 whereas the other end is wrappingly received on a conventional retractor 328. A lock, such as a tongue, is provided on seatbelt 322 and is lockingly engageable with a buckle mounted to the opposite side of the seat frame thereby forming a lap portion and shoulder portion of the restraint. A track 332 identical to track 132 is mounted to a portion of the vehicle and includes endstops 336 and 338 identical to the endstops of track 132.

A clamp 330 is slidably mounted on track 332 and is connected via an air line 340 to source of pressurized air 341 provided within the vehicle. A conventional air switch 342 is mounted remotely apart from slide 332 and clamp 330 at a position, for example, on the seat frame as depicted in FIG. 20 or on the dashboard or other consul within the vehicle. Switch 342 has a first position allowing pressurized air to be applied from source 341 via line 340 to clamp 330 and second position wherein the application of air pressure from source 341 is blocked from being applied to clamp 330. Gases other than air may be utilized in source 341 for operation of claim 330.

Clamp 330 is identical to clamp 130 except actuator 343 (FIG. 22) is used to move cam 344 (FIG. 23) in lieu of button 206 (FIG. 19B) to force the belt against deflectable tab 232. Clamp 330 has a bottom half portion 202 (FIG. 15) identical to the bottom half portion utilized for clamp 130 (FIG. 14) The top half portion 345 (FIG. 22) has a solid top wall 346 since button 206 is not included. Top half portion 345 is mounted atop and secured to the bottom half portion 202 with conventional fastening devices or other suitable fastening means. Actuator 343 includes an air piston with an extendable member 347 located within the interior top half portion 345 with actuator 343 (FIG. 22) attached via line 340 and air switch 342 to the air source 341.

Figure 22:
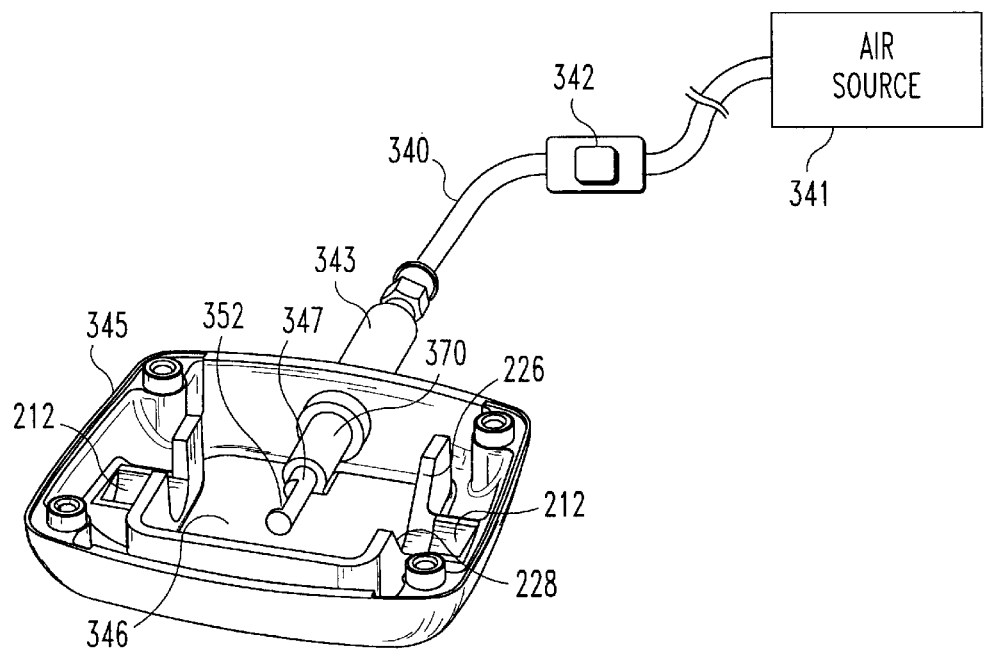
FIG. 22 is a cross-sectional view of the top half portion of the clamp of FIG. 21 taken along the line 22—22 and viewed in the direction of the arrows and shown connected to a source of pressurized air.
Figure 23:
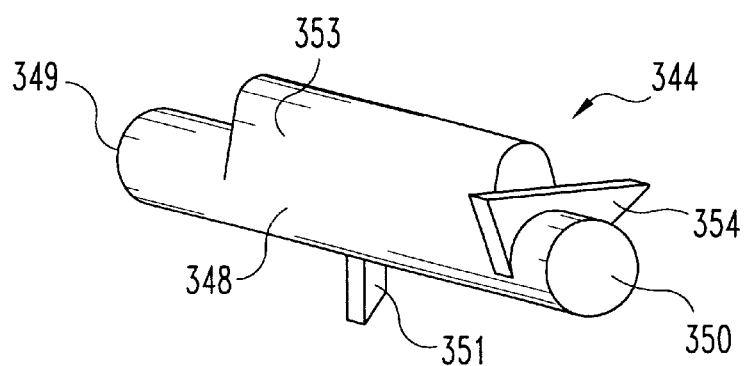
FIG. 23 is an enlarged perspective view of the cam in the clamp of FIG. 21.
Figure 24:
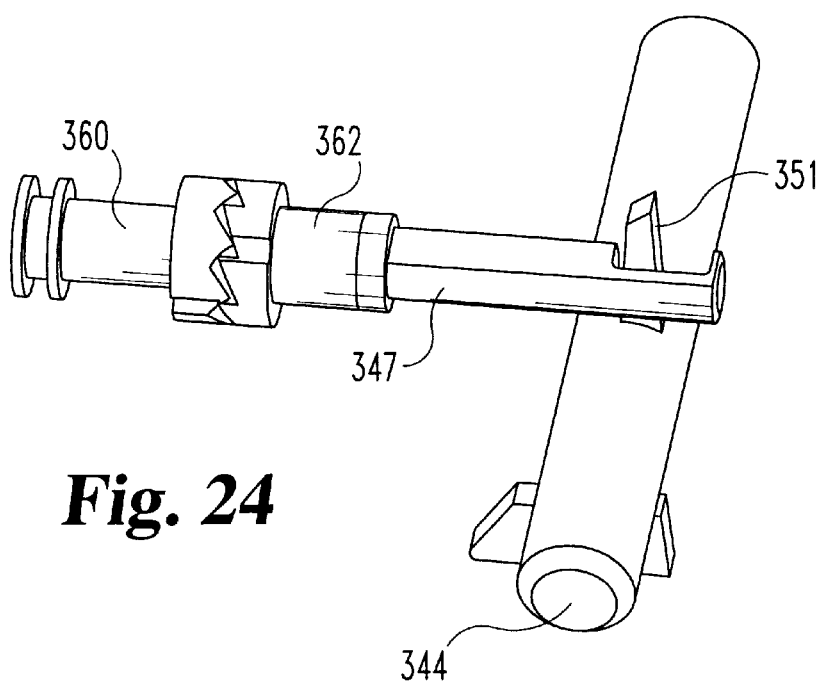
FIG. 24 is an enlarged perspective view of the air cylinder piston, rotator and push rod of FIG. 22 engaged with the cam of FIG. 23.

Cam 344 (FIG. 23) has a main body 348 with a pair of oppositely extending axles 349 and 350 received in cylindrical cavities 212 (FIG. 22). Arm 351 is cantileverly mounted to main body 348 and extends upwardly into slot 352 of extendable member 347 (FIG. 22). Lobe 353 is integrally mounted to axles 349 and 350 and extends in an opposite direction from the main body 348 as compared to arm 351. Lobe 353 provides the same function as ridge 230 (FIG. 17) formed on button 206. Thus, the distal surface of lobe 353 is movable against the seatbelt and, in turn, forces the seatbelt against tab 232 to deflect the tab downwardly against slide 332. A wedge shaped wall 354 is integrally formed on axle 350 and fits within stop surfaces 226 and 228 (FIG. 22) in a manner identical to the placement of surfaces 222 and 224 (FIG. 17) for button 206 relative to surfaces 226 and 228 (FIG. 16).

Actuator 343 (FIG. 26) includes a cylindrical main body 355 fixedly mounted to the wall of the clamp top half portion 345 by conventional fastening means. End wall 356 of the main body 355 has an air inlet 357 in communication with air line 340, in turn, connected to the source of pressurized air. Air piston 358 is slidably mounted within bore 359 and movable longitudinally therein. The piston is provided with a circumferentially extending sealing ring engaging the bore sidewall. Integrally attached to piston 358 is stem 360 having a distal end 377 extending into the hollow interior of rotator 362. Hub 363 is integrally mounted to stem 360 between piston 358 and distal end 377. Rotator 362 has a rotator hub 368 integrally mounted thereon and has a plurality of teeth 364 in meshing engagement with teeth 365 provided on hub 363.

A plurality of ribs 366 extend radially inward from the hollow interior of main body 355 and into complimentary shape slots 367 extending longitudinally on the exterior surface of hub 363. Likewise, hub 368 includes a plurality of longitudinally extending slots 369 formed on the hub exterior surface which receive ribs 366 when the rotator is in the retracted position of FIG. 25B.

A hollow cylinder 370 (FIG. 22) is integrally mounted to the sidewall of top half portion 345 of clamp 330. Member 347 has a rod shaped main body 371 (FIG. 26) with a distal end portion having slot 352 formed thereon. The proximal end portion 372 of main body 371 extends into the hollow tube shaped main body 373 integrally attached to hub 368 of rotator 362. A disc 375 is integrally mounted on main body 371 and is slidably received in cylinder 370. A helical spring 374 has opposite ends adjacent respectively disc 375 and the end wall 380 of cylinder 370 thereby normally urging member 347 in the direction of arrow 378. The end wall 380 of cylinder 370 is provided with a hole 379 through which member 347 slidably extends. A second helical spring 376 has its opposite ends positioned respectively against disc 375 and end 377 of stem 360. Helical spring 376 surrounds the main body 371 and projects into the hollow tube 373 of rotator 362. Helical spring 376 normally urges member 347 in a direction opposite of arrow 378.

Figure 25A:
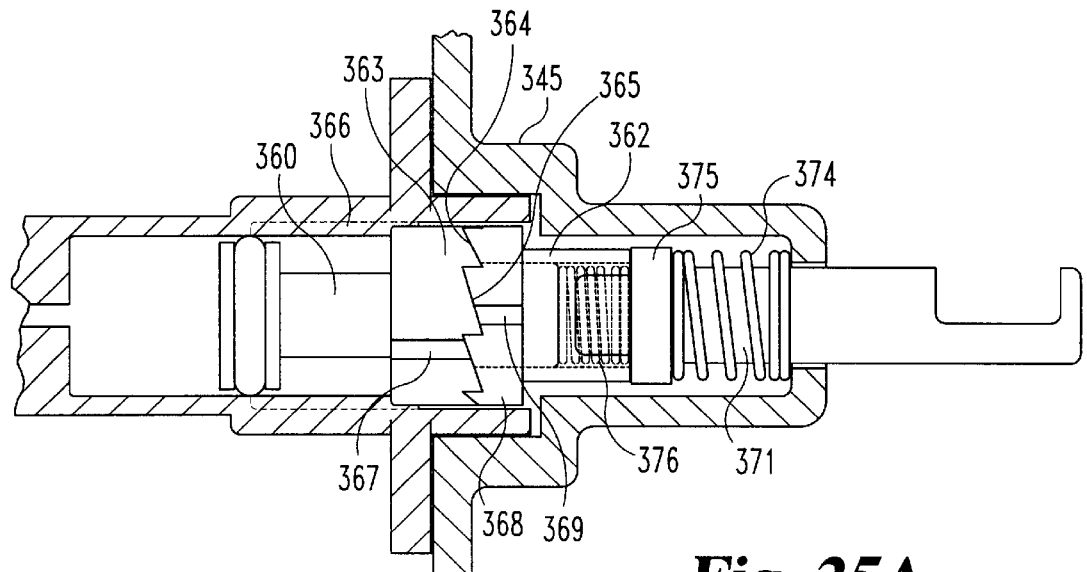
FIG. 25A is a fragmentary cross-sectional view of the air cylinder in a position corresponding to the cam of FIG. 23 locked against the seatbelt.
Figure 25B:
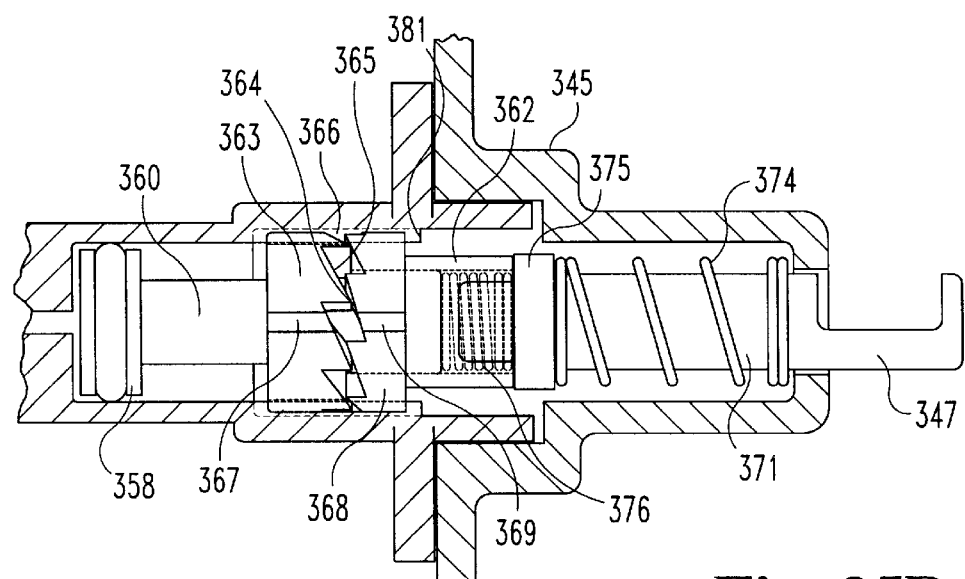
FIG. 25B is the same view as FIG. 25A only showing the air cylinder in a position corresponding to the cam spaced apart from the seatbelt.

Initially, the piston 358 and member 347 are in the position illustrated in FIG. 25B without air pressure applied to piston 358. Slots 367 and 369 are engaged with ribs 366. Upon application of air pressure via line 340 to piston 358, the piston hub 363 and rotator hub 368 are forced in a direction opposite of arrow 378 from the position of FIG. 25B thereby also forcing member 347 in a direction opposite of arrow 378 compressing helical spring 374. The downwardly extending arm 351 (FIG. 23) being received by slot 352 is caused to extend positioning lobe 353 against the seatbelt and depressing deflectable tab 232 (FIG. 15) in a manner identically described for the embodiment of FIG. 9.

As member 347 is moved in a direction opposite of arrow 378 (FIG. 26), teeth 365 of piston hub 363 and teeth 364 of rotator hub 368 are in meshing engagement; however, the angle of teeth 365 are such that a rotational force is applied by teeth 365 to teeth 364 and rotator hub 368. The rotator hub will not rotate until slots 369 become disengaged from ribs 366 at which time the rotator 362 will rotate about the longitudinal axis of the air cylinder with slots 369 then being misaligned relative to ribs 366. Thus, with slots 367 and 369 initially aligned as depicted in FIG. 25B, the piston 358 is in its most leftward position with teeth 364 in partial meshing engagement with teeth 365. Correspondingly, spring 374 is operable to force member 347 to its most leftward position as viewed in FIG. 25B with lobe 353 (FIG. 23) being disengaged from the seatbelt.

Application of air pressure to piston 358 results in hub 363 and hub 368 moving from the leftward position of FIG. 25B to the rightward position of FIG. 25A, forcing lobe 353 against the seatbelt and depressing tab 232, and disengaging slots 369 of hub 368 from ribs 366 allowing hub 368 to rotate thereby allowing complete meshing engagement between teeth 364 and 365. Relaxation of air pressure on piston 358 allows helical spring 376 in contact with the distal end 377 (FIG. 26) of stem 360 to move piston 358 to the left as viewed in FIG. 25A thereby reducing the pressure exerted by teeth 365 on teeth 364. Simultaneously, helical spring 374 forces disc 375 to apply force to tube 373 of rotator 368 to a position between the positions shown in FIGS. 25B and 25A thereby resting teeth 364 on ledge 381 (FIG. 25B) formed at the ends of ribs 366 rotating hub 368 as ledge 381 rides into teeth 364 misaligning teeth 364 relative to teeth 365 and locking rotator hub 368 in place even though piston 358 has moved to the most leftward position. Rotator hub 368 is prevented from moving past ledge 381 since slots 369 are not aligned with ribs 366. Further, slot 352 (FIG. 26) is sufficiently long to allow arm 351 (FIG. 24) to remain in position maintaining lobe 353 against the seatbelt while depressing tab 232. Thus, interruption of air pressure locks member 347 in place with lobe 353 (FIG. 23) extending downwardly pressing the seatbelt against tab 232 (FIG. 15).

Figure 26:
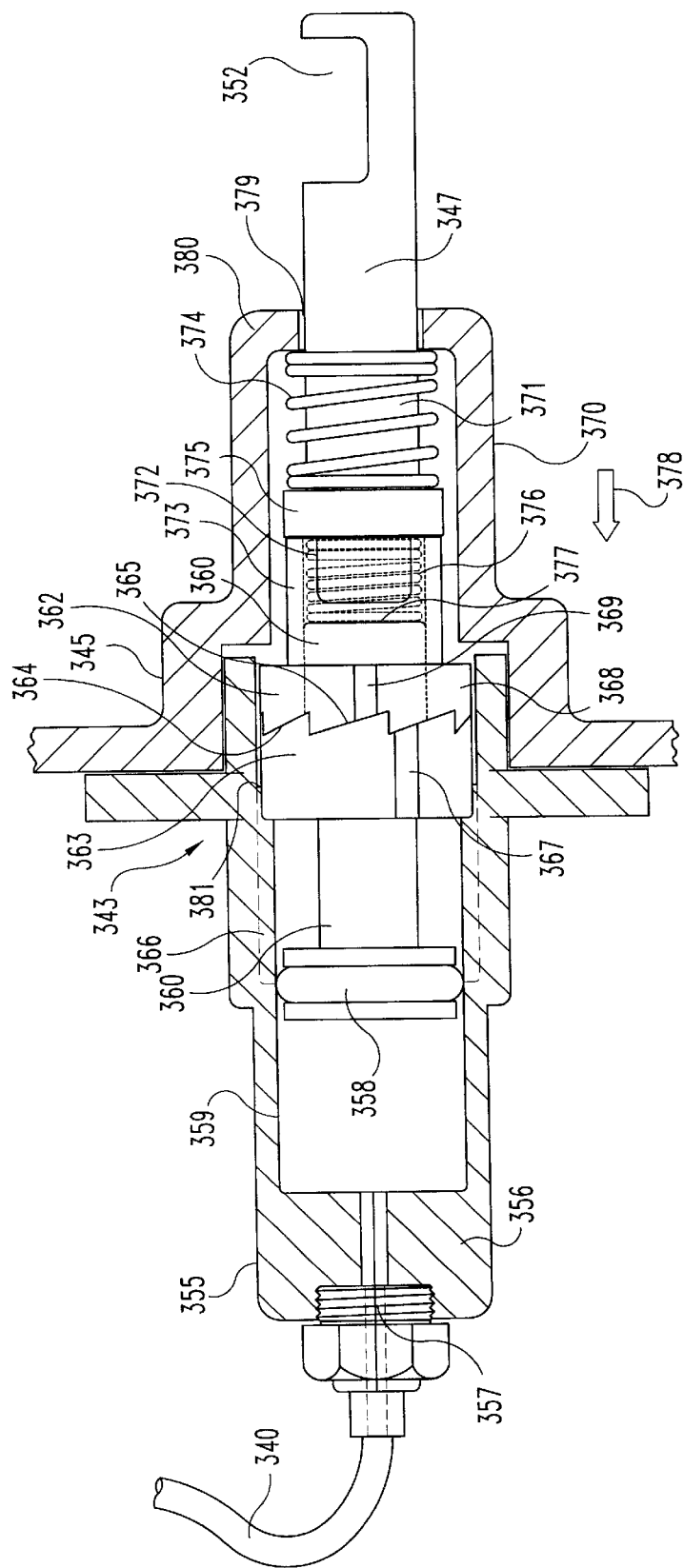
FIG. 26 is an enlarged cross-sectional view of the air cylinder of FIG. 22.

In order to unlock the actuator and move member 347 from the extended position of FIG. 26 to the retracted position of FIG. 25B, the air pressure is applied via line 340 to piston 358 causing the piston to again move in a direction opposite of arrow 378 (FIG. 26) with teeth 365 engaging teeth 364 causing further rotation of rotator hub 368 thereby aligning slots 369 with ribs 366 and allowing rotator hub 368 to then move to the left as viewed in FIG. 25B along with member 347 causing pivotal motion of cam 344 releasing the seatbelt from tab 232. The interaction of piston hub 363 and rotator hub 368 with ribs 366 is quite well known in the prior art and is typically found in ballpoint pens. The prior art, however, does not include such a mechanism in conjunction with a source of air pressure nor is known to use the mechanism in conjunction with a belt clamp.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A clamp for releasably holding an occupant-restraining belt provided on an occupant seat in a vehicle comprising:

an elongated slide mountable in a vehicle;

a housing slideably mounted on said slide and movable from a belt-clamping position to an unclamped position, said housing having a passage through which an occupant restraining belt on an occupant seat in a vehicle slidably extends therethrough, said housing including a tab movable against said slide; and an actuator having a member movably mounted on said housing and having a first position whereat said member when moved to said first position moves said belt against said tab which is moved against said slide, said actuator having a actuating control located remotely from said housing.

2. The clamp of claim 1 wherein:

said actuator includes an air operated piston associated with said member to move said member to said first position.

3. The clamp of claim 2 wherein:

said actuator includes a cam pivotally mounted in said housing with a first end forcing said belt against said tab in said first position and a second end engaged by said member, said air operated piston movable upon application of air pressure thereto to move said member and in turn move said cam.

4. The clamp of claim 3 wherein:

said slide and said housing are located apart from said occupant seat whereas said actuating control is located on said occupant seat.

5. The clamp of claim 3 wherein:

said slide and said housing are located apart from said occupant seat and apart from said actuating control.

6. The clamp of claim 3 wherein:

said piston includes a plurality of first teeth and said actuator includes a rotator with a plurality of second teeth, said first teeth and said second teeth being engageable to cause rotation of said rotator.

7. A restraint system for an occupant in a vehicle, comprising:

a source of pressurized air;

an occupant seat;

a seatbelt for securing an occupant on said seat;

a retractor for retracting said seatbelt and capable of holding said seatbelt during deceleration of the vehicle;

a slide; and a clamp movable on said slide and having a tab movably mounted thereon, said clamp further having an actuator connectable to said source of pressurized air to move said seatbelt against said tab to limit relative motion between said seatbelt and said clamp.

8. The restraint system of claim 7 wherein:

said actuator includes a control to direct pressurized air from said source with said control located remotely from said slide and said clamp.

9. The restraint system of claim 8 wherein:

said actuator includes a cylinder with an air piston slideably mounted therein but constrained against rotation in said cylinder, said piston includes a first set of teeth, said actuator further includes a rotator slidably mounted in said cylinder with a second set of teeth in meshing engagement with said first set of teeth, said actuator further includes a push rod slidable mounted in said cylinder and extendable therefrom upon movement of said air piston, and a cam pivotally mounted in said housing engaged by said push rod to move said cam against said belt to clamp said seatbelt.

10. A restraint system for a passenger in a vehicle, comprising:

a passenger seat;

a seatbelt for securing a passenger within said seat;

a retractor for retracting said seatbelt and capable of holding said seatbelt during deceleration of the vehicle;

a track with first and second endstops;

a clamp movable on said track between said first and second endstops, said clamp including a deflectable lock; and, an actuator with a control located remotely from said clamp to move said deflectable lock to secure said seatbelt.

11. The restraint system of claim 10 and further comprising:

a source of air pressure connectable to said actuator to move said deflectable lock to secure said seat belt; and, wherein said control includes a control switch connected between said actuator and said source of air pressure with said actuator including an air piston with said control switch controlling air pressure applied to said air piston.

12. The restraint system of claim 11 wherein:

said actuator further includes a cam pivotally mounted in said clamp and an extendable member movable by said air piston to move said cam against said seatbelt and in turn said seatbelt against said lock.

13. A method for releasably clamping a seatbelt, comprising:

providing a retractor, a clamp with a movable lock, a source of pressurized air, and a track, said track having a first stop, a second stop, and a support position, the clamp being slidable along the track between the first stop and the second stop;

applying tension in the seatbelt by the retractor;

locking the seatbelt to the clamp by directing air from said source of pressurized air to move said lock;

moving the clamp and seatbelt to a support position along the track; and supporting the clamp and seatbelt such that the tension in the belt from the retractor is applied at the support position.

* * * * *